United States Patent Office 3,082,481
Patented Mar. 26, 1963

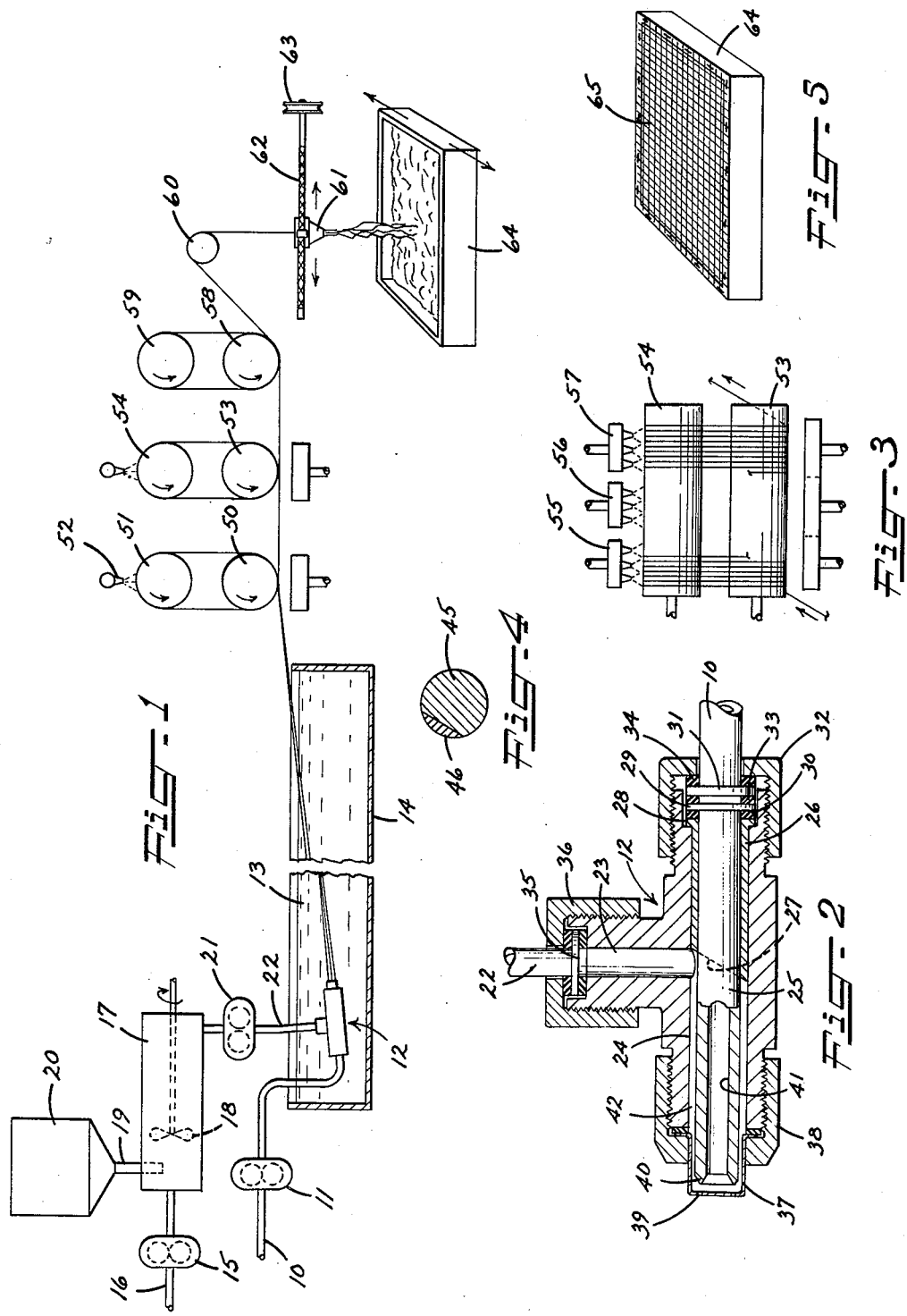

3,082,481
METHOD OF MAKING A GAS FILTER
George M. Hinde, Media, and Robert L. McDowell, Springfield, Pa., assignors to American Viscose Corporation, Philadelphia, Pa., a corporation of Delaware
Filed May 13, 1959, Ser. No. 812,906
4 Claims. (Cl. 18—47.5)

This invention relates to gas filters such as air filters used in heating, ventilating and air-conditioning equipment and more particularly to a filter especially adapted for removing malodors from air streams.

Hot-air heating systems, air-conditioners and ventilating systems for homes, office buildings, etc. are almost universally provided with filters for removing dust and dirt particles from the air stream passing therethrough. These filters generally comprise a more or less rectangular frame, usually formed of heavy paperboard filled with a fibrous mat coated with an adhesive. Suitable open-mesh or foraminous screens are provided on the front and back of the frame to retain the fibrous mat in position. While these filters are reasonably effective for removing dust and dirt from the air, they offer no appreciable barrier to the passage of odors.

While it has long been known that activated carbon will effectively adsorb a large variety of odors, there has been a problem in incorporating a sufficient quantity of this material in a filter in a manner which does not seriously interfere with the passage of air. In the copending application of Robert L. McDowell, Serial No. 602,964 filed August 9, 1956, now abandoned, there is disclosed means for incorporating substantial amounts of activated carbon dust or powder or other small patricles in a so-called conjugate synthetic filament in a manner such that an appreciable amount of the activated carbon is on or near the surface of the filament whereby it is in a position to be contacted by the gas to be adsorbed. The present invention provides a gas filter employing filaments similar to those of the above application as the filtering medium and further provides an efficient method of making such a filter.

It is an object of the present invention to provide an improved gas filter especially adapted for removing odors from an air stream.

It is another object of this invention to provide an economical method of making an air filter having activated carbon-loaded filaments as the filtering medium.

Other and further objects, features and advantages of the invention will become apparent as the description of preferred embodiments thereof proceed.

Briefly described the new filter comprises a filter frame which may be generally rectangular or of such other shape as may be appropriate for use with a particular piece of equipment. Usually the filter frame will be formed of heavy paperboard but could of course be formed of some other material such as wood or metal. Both faces of the frame are covered with an open-mesh screen or the like and between the screens is the filtering medium consisting of a plurality of continuous activated carbon-loaded filaments arranged in random fashion. In a preferred form of the invention the filaments are formed of regenerated cellulose and contain 80–90% activated carbon based on the weight of the filaments.

In general, the method of making the filter consists of extruding an activated carbon containing spinning solution such as viscose into a setting medium, which in the case of viscose is an acid spin bath, to form a multiplicity of filaments and then collecting the filaments in random fashion directly within the confines of the filter frame without ever having wound the filaments on a core or formed them into a cake, as is generally the practice when making synthetic yarn or thread. This method enables the use of filaments having a very high carbon content and which as a result have such a low tensile strength and are so brittle when dry as to make ordinary collection methods impractical. It also makes for great economy in production by eliminating unnecessary handling of the filaments.

Referring now to the drawing:

FIGURE 1 is a diagrammatic view showing a suitable form of apparatus for carrying out the method and forming the filter of the present invention;

FIGURE 2 is a sectional view through a spinneret coupling employed in the apparatus;

FIGURE 3 is a side elevational view of one of the pairs of thread-storing, thread-advancing drums;

FIGURE 4 is a sectional view through one of the filaments; and

FIGURE 5 is a perspective view of the filter.

While the filaments employed as the filtering medium may be formed in the manner disclosed in the above referred to application Serial No. 602,964, the present invention contemplates a modified spinning arrangement as being more economically feasible. Referring to FIGURE 1, a spinnable viscose solution is metered through line 10 by a pump 11 to a spinneret coupling, generally indicated at 12, immersed in a conventional acid spinning bath 13 contained in a trough 14. At the same time a second viscose stream is metered by a pump 15 through a line 16 into a blender 17 where it is thoroughly mixed by a stirrer 18 with an aqueous carbon dispersion admitted to the blender through a line 19 from a tank or dispenser 20. This dispersion may comprise about 25% to 35% by weight or more, based on total amount of dispersion, of an active adsorptive fine-mesh carbon in water and a small amount of an emulsifier or dispersant. From the blender 17 the activated carbon containing viscose is metered by a pump 21 through a line 22 to the spinneret coupling 12.

Referring now to FIGURE 2, the spinneret coupling 12 comprises a T-fitting having intersecting bores 23 and 24 extending longitudinally through the arms thereof. The bore 24 is of greater diameter than the bore 23 and has positioned concentrically therein a tubular member 25 held in its centered position by means of a sleeve 26 which embraces said tubular member for approximately half its length and fits tightly within the bore 24. The sleeve 26 is tapered at one end as indicated at 27 and at its other end is provided with a flange 28 which fits within an enlarged recess in one end of the horizontal arm of the T-fitting. The tubular member 25 is provided with a flange 29 which fits within the enlarged recess and is spaced from the flange 28 by a metal spacer or washer 30. The line 10 is provided with an annular flange 31 which also fits within the enlarged recess of the horizontal arm. A screw cap 32 holds the parts assembled as shown in the drawing, sealing rings 33 and 34 being provided on either side of the flange 31.

The line 22 has an annular flange 35 at the end thereof which is fitted within an annular recess in the upper portion of the vertical arm of the T-fitting. Sealing rings are provided on opposite sides of the flange 31 and the line 22 is connected to the spinneret coupling by means of a cap screw 36 with the line in communication with the bore 23.

A cup-shaped spinneret 37 is connected to one end of the horizontal arm of the coupling 12 by means of a screw cap 38. The spinneret has a single circular row of orifices 39 and the tubular member 25 terminates at a point closely adjacent the rear face of the spinneret. The end of the tubular member 25 is tapered as indicated at 40 to provide a relatively narrow ring or septum which describes a circle preferably but not necessarily longitudinally aligned with the centers of the orifices of the spinneret.

The viscose solution from the line 10 passes through the longitudinal central bore 41 of the tubular member 25 and the carbon containing viscose from the line 22 passes through the bore 23 and through an annular channel 42 provided between the tubular member 25 and the bore 24 of the coupling. The tapered end 27 of the sleeve 26 aids in directing the flow of the carbon containing viscose toward the spinneret. The two different viscoses come together at a point directly behind the holes of the spinneret and are extruded simultaneously through the holes to form a plurality of filaments each of which would appear in cross-section as shown in FIGURE 4. By changing the thickness of the spacer 30 the distance between the septum 40 and the rear face of the spinneret may be varied and this will affect the manner in which the plain viscose and carbon containing viscose pass through the orifices of the spinneret. Preferably the septum should be so located that the plain viscose passing through each orifice forms a thin film over a small section of the filament and in FIGURE 4 the carbon containing portion of the filament is indicated at 45 and that portion formed of the plain viscose is indicated at 46. Actually the line of demarcation between these portions of the filament is not as regular as shown in the drawing and in fact it varies somewhat throughout the length of the filament, but the objective is to obtain a filament having just enough of its body formed from the plain viscose as to give the entire filament the minimum amount of strength necessary to prevent it from breaking before it is loaded into the filter frame, it being understood that the carbon containing portion of the filament is so heavily loaded with carbon that it has very little tensile strength. For the purposes of the present invention it is preferred that the carbon account for about 80 to 90% or more of the weight of the filament.

The viscose may be of any ordinary viscose such as normally employed for spinning rayon yarn, for example, a composition of 8.0% cellulose, 7.0% sodium hydroxide and 36% $CS_2$ based on cellulose. In a preferred embodiment, the spinning bath 13 is composed of 15% $H_2SO_4$, 20% $Na_2SO_4$ and water and is at a temperature of 50° C. The filaments are coagulated and the cellulose regenerated during approximately 8 ft. of travel through the bath. Desirably there are approximately 20 filaments of 1000 denier each.

Upon emergence from the bath the filaments are led as a bundle to a pair of thread-storing, thread-advancing drums 50 and 51 where they are washed with plain water at from 65 to 70° C. The water may be applied to the top drum 51 through nozzles 52 and drip into a suitable drain pan. From the drums 50 and 51 the bundle of filaments proceeds to an additional pair of after-treatment drums 53 and 54 where they receive an additional water wash applied through spray nozzles 55. This water wash is applied over approximately the first third of the length of the drums after which a 3½% bicarbonate of soda solution is applied through nozzles 56 over approximately the second third of the length, and during the final portion of travel about these drums the filaments receive another washing of water supplied by nozzles 57. From the drums 53 and 54 the filaments proceed to dryer drums 58 and 59 where they are only partially dried so that when they leave the dryer drums they have approximately 70% moisture content.

From the dryer drums the bundle of filaments is led over a guide wheel 60 and downwardly to and through an aspirator 61. The aspirator, which may be of any desired construction, is mounted upon a reversing screw 62 rotated by a pulley 63 so as to traverse the aspirator back and forth along the length of the screw. A generally rectangular filter frame 64, closed at the bottom by an open-mesh screen, not shown, and open at the top, is positioned beneath the aspirator and reciprocated by suitable means back and forth transversely to the movement of the aspirator so that the filaments emerging from the aspirator are deposited and collected in a random fashion within the confines of the filter frame. The aspirator 61 exerts just enough pull on the bundle of filaments to direct them into the filter frame but as the filaments pass through the aspirator the action of the aspirator causes them to spread out and separate from one another so that they are deposited in a haphazard or random fashion.

When the filter frame is full of the loosely packed, randomly arranged filaments, the filaments are cut below the aspirator and the loaded frame is removed and an open-mesh cover 65 is secured in place to complete the formation of the filter. The filter is then placed in an oven and the filaments are completely dried. The completely dry filaments, due to the high carbon content, are quite brittle but since they are already in position in the filter frame this is not a disadvantage.

While the invention has been illustrated using viscose as the spinning solution, it should be pointed out that other filament-forming materials are also operative. These include thermoplastics such as cellulose esters of the type of cellulose acetate and propionate, mixed cellulose esters such as cellulose aceto-propionate and aceto-butyrate, cellulose ethers such as methyl, ethyl, benzyl cellulose, etc., mixed cellulose ethers, mixed cellulose ester-ethers like methyl or ethyl cellulose acetate, vinyl resins such as acrylic and methacrylic resins, vinyl ester polymers such as vinyl acetate, vinyl ether polymers such as vinyl acetals, vinylidene halides such as vinylidene chloride, polyethylene and polypropylene, nylons such as polyhexamethyleneadipamide, polyesters such as polyethylene terephthalate, copolymers of vinyl esters and vinyl halides, notably vinyl acetate-vinyl chloride, polyacrylonitrile, Saran, etc. The spinning process must of course be adapted to the spinning solution; e.g., cellulose acetate would be dry-spun into gaseous acetone and nylon would be melt-spun.

Having thus described the invention, what is claimed is:

1. The method of making a gas filter comprising extruding an activated carbon-containing filament-forming composition through the orifices of a spinneret into an acid coagulating bath to form a multiplicity of activated carbon-containing continuous filaments, removing the filaments from the bath and subjecting them as a running strand to liquid after-treatments, subjecting the running strand of filaments to a drying action to reduce the moisture content to no less than about 70%, depositing the running strand directly within the confines of a filter frame, and completing the drying of the filaments.

2. The method of making a gas filter comprising extruding a viscose solution containing about 80–90% by weight activated carbon based on dry filament weight through a multi-holed spinneret into an acid coagulating bath to form a multiplicity of carbon-containing cellulosic continuous filaments, removing the filaments from the bath and subjecting them to liquid after-treatments, partially drying the filaments, and depositing them in random arrangement in a filter frame.

3. The method of making a gas filter comprising extruding a viscose solution containing about 80–90% by weight activated carbon based on dry filament weight through a multi-holed spinneret into an acid coagulating bath to form a multiplicity of carbon-containing cellulosic continuous filaments, removing the filaments from the bath and subjecting them to liquid after-treatments, partially drying the filaments, depositing them in random arrangement in a filter frame, and then completely drying the filaments.

4. The method of making a gas filter comprising extruding an activated carbon-containing filament-forming composition through the orifices of a spinneret into an acid coagulating bath to form a multiplicity of activated carbon-containing continuous filaments, removing the filaments from the bath and subjecting them as a running strand to liquid after-treatments, subjecting the running strand of filaments to a drying action, passing the strand downwardly through an aspirator to cause the filaments to spread out and separate from one another, and moving the aspirator and a filter frame relative to one another in such manner that the filaments are deposited randomly within the frame.

References Cited in the file of this patent

UNITED STATES PATENTS

| | | |
|---|---|---|
| 1,814,190 | Sebastian et al. | July 14, 1931 |
| 1,818,155 | Oglesby et al. | Aug. 11, 1931 |
| 2,357,392 | Francis | Sept. 5, 1944 |
| 2,374,540 | Hall | Apr. 24, 1945 |
| 2,411,660 | Manning | Nov. 26, 1946 |
| 2,612,966 | Nicol | Oct. 7, 1952 |
| 2,795,290 | Butsch et al. | June 11, 1957 |
| 2,888,095 | Perrini et al. | May 26, 1959 |
| 2,919,211 | Labino | Dec. 29, 1959 |
| 2,923,378 | Braunlich | Feb. 2, 1960 |
| 2,925,879 | Costa et al. | Feb. 23, 1960 |

FOREIGN PATENTS

| | | |
|---|---|---|
| 711,735 | Great Britain | July 7, 1954 |